June 7, 1949.  S. B. CRARY  2,472,571
REGULATING SYSTEM
Filed Aug. 1, 1946
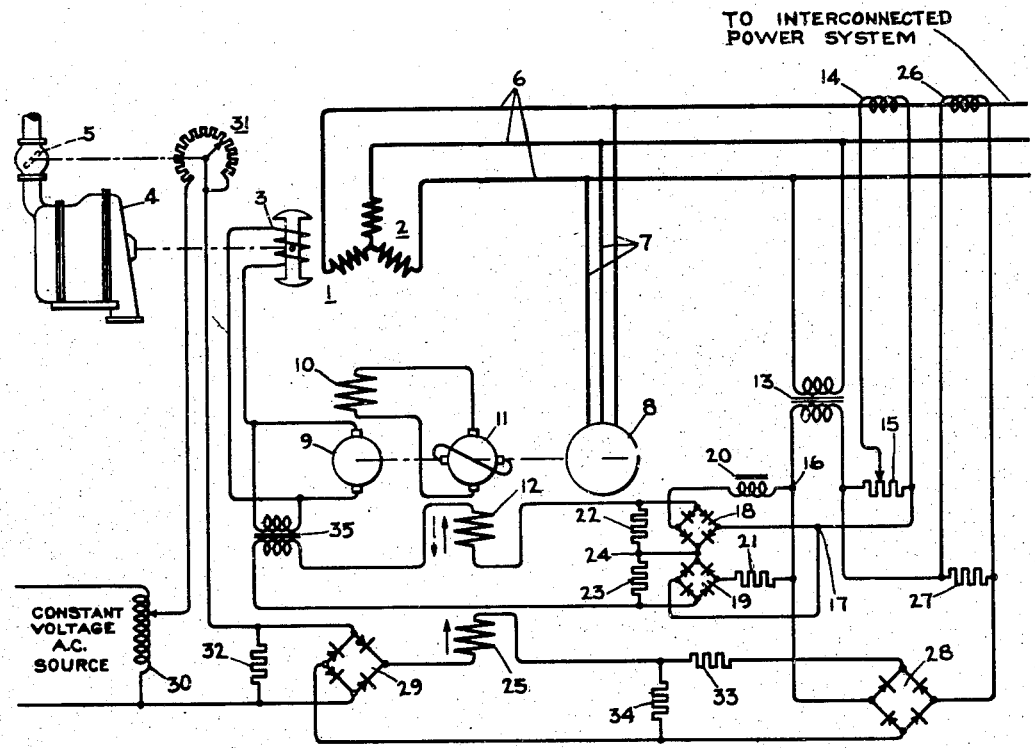
Inventor:
Selden B. Crary,
by Prowell S Mack
His Attorney.

Patented June 7, 1949

2,472,571

UNITED STATES PATENT OFFICE 2,472,571

REGULATING SYSTEM

Selden B. Crary, Schenectady, N. Y., assignor to General Electric Company, a corporation of New York Application August 1, 1946, Serial No. 687,634

11 Claims. (Cl. 290—7)

My invention relates to regulating systems and more particularly to improvements in automatic voltage regulating systems for synchronous generators.

The present invention is a modification and an improvement of the invention disclosed and claimed in U. S. Patent No. 2,259,091 issued upon an application of L. W. Thompson and S. B. Crary and assigned to the same assignee as the present invention. In this patent a system for providing a variable lower limit of field excitation on a prime mover-driven synchronous generator interconnected with a power system is disclosed. It has been found in many cases that the loss of synchronism of a synchronous generator with its interconnected power system is attributable to the action of the automatic voltage regulator with which such generators are customarily equipped. In attempting to reduce an overvoltage on the system by reducing the field excitation of the interconnected synchronous generator, the excitation is often reduced to such a low value that if there is any appreciable load on the regulated machine, the decreased value of field excitation will be insufficient to provide enough synchronizing torque to maintain the regulated generator in synchronism with the interconnected system; and as a result, the generator will fall out of synchronism with a resultant flow of heavy armature currents, the operation of automatic protective devices and possible disruption of service. In accordance with my invention, I provide an automatic regulating system for a synchronous generator for preventing loss of synchronism due to underexcitation of the generator field by providing a lower limit of field excitation that is correlated with the internal generator voltage back of transient reactance of the generator to be regulated, and this lower limit is automatically varied or adjusted in accordance with the real power load on the generator as reflected in the load on the prime mover.

It is, therefore, an object of my invention to provide a new and improved regulating system for synchronous generators.

Another object of my invention is to provide an automatic regulating system for use with synchronous generators controlled by automatic voltage regulators to prevent loss of synchronism of such generators with the interconnected power system.

A further object of my invention is to provide a new and simplified static regulating system for limiting the field excitation of a synchronous generator to a predetermined minimum and for varying such minimum limit in accordance with the electrical load on the generator.

My invention will be better understood from the following description taken in connection with the accompanying drawing, and its scope will be pointed out in the appended claims. The single figure of the accompanying drawing illustrates diagrammatically an embodiment of my invention.

Referring now to the drawing, I have shown a synchronous alternating current generator 1 having three-phase armature windings 2 and the conventional rotating field winding 3 arranged to be driven by any suitable prime mover, such as a steam turbine 4. For controlling the speed and power output of the turbine 4, a throttle 5 is provided and diagrammatically illustrated as a simple butterfly valve in the steam input line to the turbine. The synchronous generator 1 is connected through a three-phase circuit 6 to supply power to an external system (not shown), and energy is also supplied from this circuit by means of the conductors 7 to the induction motor 8 for driving the main generator exciter set. Energizing current for the generator field winding 3 is supplied by a direct current exciter 9 having a separately excited field winding 10 which is, in turn, supplied with exciting current from a dynamoelectric generator or pilot exciter 11. The pilot exciter 11 may be any conventional direct current generator, but for ease of control and increased sensitivity, I have provided an exciter of the compensated armature-reaction excited type. The direct current exciter 9 and the pilot machine 11 are both arranged to be mechanically driven by the induction motor 8. It should be understood that any other suitable form of excitation supply may be used, such as an exciter directly connected to the main alternator shaft, or an exciter driven by an auxiliary steam turbine as its prime mover. The showing of a separate motor driven exciter is purely to illustrate one arrangement for excitation supply that is commonly used.

For controlling the output of the pilot generator 11, and consequently regulating the excitation of the generator field 3, a buck and boost control field winding 12 is provided on the generator 11, which winding is energized in accordance with the electrical conditions existing on the main power circuit 6. The voltage and current responsive circuit for controlling the excitation of the control field 12 includes a potential transformer 13 providing a voltage component proportional to the system voltage existing on the circuit 6, and a current transformer 14 the output of which is proportional to load current in the circuit 6. The output of the current transformer 14 is applied across a selected portion of the resistor 15 which is in series with the output of the potential transformer 13; therefore, the resultant voltage appearing at the points 16 and 17 is proportional to both terminal voltage and load current of the generator 1. If it is desired to compensate for line drop, the current proportional component will be subtractive to the output of the potential transformer 13, whereas for parallel operation of alternators, droop will be required and in this case the current proportional voltage component should be additive with respect to the potential transformer 13. The circuit as thus described is responsive only to single-phase voltage and current in circuit 6; however, if three phase response is desired conventional positive phase sequence voltage and current networks may be substituted in the manner well known in the art.

In order to provide a sensitive buck and boost excitation of the control field 12, a nonlinear voltage sensitive circuit is provided. A pair of full wave rectifiers 18 and 19 are connected with their input terminals in parallel to the points 16 and 17; and in series with the input circuit to rectifier 18 is a saturable reactor 20 and in series with the input circuit of rectifier 19 a resistor 21 is provided. The direct current output terminals of the rectifiers 18 and 19 are connected in series and of opposite polarity. In order that current may flow when the rectifier output voltages are unbalanced, a pair of resistors 22 and 23 are shunted across the output circuit of the rectifiers with the common point 24 of the resistors connected to the common terminal of the rectifier output circuits. The nonlinear voltage sensitive circuit as just described provides means for producing a current flow in control field winding 12 which will be in one direction for a relatively high value of voltage appearing across the points 16 and 17, and in the reverse direction for a relatively low value of voltage appearing across these points. The output voltage of rectifier 19 is directly proportional to the voltage appearing across points 16 and 17 since there is only resistance drop in this circuit through the resistor 21. However, the output voltage of rectifier 18 will vary nonlinearly with the voltage across the points 16 and 17 due to the saturation of the reactor 20, and at the intersection of the linear resistance characteristic and the nonlinear saturation characteristic, the output voltages of rectifiers 18 and 19 will be equal and opposite. For a relatively high value of voltage across points 16 and 17 representative of an overvoltage on the system 6, the output voltage of the rectifier 19 will be less than the voltage of the rectifier 18 and current will flow through the midpoint connection 24 and the resistance 23 in such a direction as to energize the control field 12 to produce a bucking flux as shown by the dotted arrow alongside the field winding 12. This will reduce excitation of the generator 11 and consequently reduce the output of the exciter 9 and the excitation of the synchronous generator field winding 3 with resultant decrease in generator terminal voltage. In the event of a decrease in voltage across the points 16 and 17, the output voltage of the rectifier 18 will be proportionately less than the output of the rectifier 19 and current will flow through the midpoint connection 24 and the resistance 22 in a direction opposite to that previously described, thereby producing a boosting flux in the control field winding 12, as shown by the solid arrow alongside the winding 12. From the foregoing it can be seen that the system as thus far described provides a normal regulating action responsive to voltage and current output of the generator 1 and operative to increase alternator excitation when the terminal voltage is low and decrease alternator field excitation when the terminal voltage is higher than normal. Line current compensation is provided for by the component of voltage appearing across resistor 15 which is proportional to line current, and which is relatively small compared to the component proportional to voltage.

In order to provide a lower limit of field excitation on the generator 1, a second control field winding 25 is provided on the pilot generator 11 and excitation of this winding is effected in accordance with the throttle setting of the prime mover 4 which is, in turn, proportional to the real power being supplied by the generator 1. The minimum value of the lower limit of main generator excitation is determined in accordance with the electrical characteristics of the generator 1 and the electrical load by means of a circuit including the current transformer 26 and the resistance 27, and by means of rheostat 31. The ohmic value of the resistance 27 is selected to approximately equal the ohmic value of transient reactance of the generator as modified by the turn ratios of potential transformer 13 and current transformer 26. Thus a voltage is developed across the resistance 27 and the secondary winding of the transformer 13 in series which is proportional to the voltage produced in the alternator back of transient reactance of the generator; that is, the vector summation of the voltage drop across the secondary winding of transformer 13 and the voltage drop across resistor 27 gives a result which equals the internal voltage of the generator back of the transient reactance. By definition, the voltage back of the transient reactance of a generator is an equivalent voltage used in determining machine and system performance and has a value approximately directly proportional to the alternator field flux interlinkages. The component of this voltage across resistor 27 is directly proportional to load current for all values of load current and is arranged additive to the voltage output of the potential transformer 13 with which it is connected in series. Thus the voltage appearing across the input terminals of the rectifier bridge 28 is proportional to or representative of the terminal voltage of the machine plus the transient reactance voltage drop in the machine, thereby corresponding to the internal generated voltage of the generator or its voltage back of transient reactance. Control field winding 25 of the amplidyne is arranged to be energized by a differential voltage which exists only when the output voltage of the rectifier 28 is less than the output voltage of the rectifier 29, which latter voltage is proportional to or correlated with the load on the alternator 1 by means of the rheostat 31, and as indicated by the throttle setting of the turbine 4. The input to the rectifier 29 is supplied from a constant voltage alternating current source, as shown, through an auto-transformer 30 and the value of voltage applied to the rectifier 29 is varied by the position of the rheostat 31, depending on the position of the throttle valve 5 of the turbine, being a maximum when the throttle valve is in the full open position. Resistances 32 and 33, respectively, are placed in the field limiting circuit for purposes of initial adjustment of the excitation limit to the proper value when the regulating system is first placed in operation. Resistance 34 permits current to flow in the control field winding 25 when the load proportional voltage across rectifier 29 exceeds the voltage back of transient reactance, as represented by the voltage across the output terminals of rectifier 28. When the voltage across rectifier 28 exceeds the potential across rectifier 29, current flow in the reverse direction through the control field 25 is prevented by the blocking action of the rectifier 29. A conventional stabilizing transformer 35 is provided having one winding connected across the output of the direct current generator 9 and the other winding connected in series with the buck and boost control field 12 to eliminate hunting or oscillation of the regulating circuit.

The lower limit field excitation circuit, under normal operating conditions of the generator 1 and interconnected system, will not be energized, and field excitation of the main generator will be regulated to maintain constant voltage by the regulating action of control field 12 acting in response to the electrical conditions existing on circuit 6. In the case of system disturbances, the system voltage may rise and under these conditions, the normal regulating action will tend to decrease field excitation to reduce alternator and system voltage. This reduction in excitation may continue to a point where alternator field excitation is so weakened that there is insufficient synchronizing torque present in the alternator and it will lose synchronism with the system, thus increasing the severity of the system disturbance. The lower limit field circuit prevents this abnormal reduction in alternator field strength by adding a boosting component of flux in the pilot exciter 11, thus preventing further reduction in exciter output.

The voltage in the alternator back of transient reactance may be used as a measure of the synchronizing torque of the alternator, and as long as this voltage is maintained above a permissible minimum value for a given prime mover output, synchronism will not be lost. Since this minimum value varies directly with alternator load, the lower limit of field excitation should be adjusted with changes in load by means of rheostat 31. Under normal conditions this excess or differential voltage will cause no current flow through the limit field 25 due to the blocking or unidirectional characteristics of the rectifier 29. However, under conditions of system disturbance, the internal voltage back of transient reactance may be reduced to a dangerously low value due to reduced alternator field excitation by normal regulating action. If the alternator is carrying load under these conditions, the load proportional voltage, as regulated by the rheostat 31, appearing across the rectifier 29 will exceed the voltage across rectifier 28 and the excess or differential voltage will cause current to flow through the limit field 25 and resistance 34. This current flow is in a direction to produce a boosting flux in pilot exciter 11 and will restore alternator excitation to a value where the internal alternator voltage is sufficient to maintain synchronism with the interconnected system.

As long as the voltage back of transient reactance is of sufficient magnitude to maintain synchronism, the voltage across rectifier 28 will exceed the load proportional voltage across rectifier 29 and the limit field will not be energized. It will be seen that the lower limit of excitation as maintained by the control field 25 is continuously and automatically adjusted for any value of load being held on the alternator, so that the synchronizing torque of the alternator is maintained at a value that will keep the alternator in synchronism with the interconnected power system during increases in system voltage.

While I have shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In a regulating system for a prime mover driven synchronous generator having a field winding, field excitation supply means for said generator, regulating means for said field excitation supply means responsive to an electrical output condition of said generator, lower limit excitation control means responsive to the internal voltage back of the transient reactance of said generator for varying the excitation to said field winding to maintain the excitation of said generator above a predetermined minimum value, and means responsive to the load on said generator and connected to control said excitation control means thereby to determine said predetermined minimum value in accordance with said load.

2. A field excitation control system for a synchronous generator driven by a prime mover comprising, a source of excitation for said generator field, means responsive to an electrical output condition of said generator for regulating the excitation supplied to said generator field, lower limit excitation control means for obtaining a potential proportional to the internal voltage back of the transient reactance of said generator including a resistance of effectively equal ohmic value to the transient reactance ohmic value of said generator, means for obtaining a second potential proportional to the electrical load on said generator, and means for limiting the minimum value of excitation supplied to said generator field by comparing said first potential with said second potential and applying the excess of said second potential over said first potential to said excitation regulating means to render said excitation regulating means ineffective to reduce field excitation below a predetermined minimum value.

3. A field excitation control system for a synchronous generator driven by a prime mover comprising, a source of excitation for said generator field, means responsive to the terminal voltage of said generator for regulating the excitation supplied to said generator field to maintain said generator terminal voltage constant, means for obtaining a potential proportional to the internal generated voltage of said generator including a resistance of effectively equal ohmic value to the ohmic value of transient reactance of said generator, means for obtaining a second potential proportional to the electrical load on said generator including a rheostat positioned in accordance with the load on said prime mover, and means for limiting the minimum value of excitation supplied to said generator field by comparing said first potential with said second potential and applying the excess of said second potential over said first potential to said excitation regulating means to render said excitation regulating means ineffective to reduce field excitation below a predetermined minimum value.

4. A field excitation control system for a synchronous generator driven by a prime mover comprising, a source of excitation for said generator field including a dynamo-electric exciter, means responsive to the output voltage of said generator for controlling the output of said exciter to maintain said generator output voltage constant, means for obtaining a potential proportional to the internal generated voltage of said generator including a resistance of effectively equal ohmic value to the ohmic value of transient reactance of said generator, means for obtaining a second potential proportional to the electrical load on said generator including a rheostat variable in accordance with the position of the throttle of said prime mover, and means for limiting the generator field excitation lowering action of said dynamo-electric exciter by comparing said first potential with said second potential and applying the excess of said second potential over said first potential to said exciter output control means to render said exciter ineffective to reduce generator field excitation below a predetermined minimum value.

5. An automatic regulating system for a synchronous generator having a field winding comprising, excitation supply means for said generator field including a dynamo-electric machine, a control field winding for said dynamo-electric machine, means responsive to an electrical output condition of said generator for varying the energization of said control field winding to maintain constant said generator electrical output condition, a second control field winding for said dynamo-electric machine, means responsive to the electrical load on said generator for energizing said second control field only in one direction to limit field excitation reducing action of said first control field to a predetermined value, and means responsive to the internal generated voltage of said generator for automatically directly varying said predetermined lower limit of excitation as a function of internal generated voltage.

6. An automatic regulating system for a synchronous generator having a field winding comprising, excitation supply means for said generator field including a dynamo-electric machine, a control field winding for said dynamo-electric machine, means responsive to the terminal voltage of said generator for inversely varying the energization of said control field winding to maintain constant said generator terminal voltage, a second control field winding for said dynamo-electric machine, means responsive to the electrical load on said generator for energizing said second control field only in one direction to limit field excitation reducing action of said first control field to a predetermined value, and means responsive to the internal generated voltage of said generator for preventing energization of said second control field.

7. An automatic regulating system for a synchronous generator having a field winding comprising, excitation supply means for said generator field including a dynamo-electric machine, a control field winding for said dynamo-electric machine, means responsive to the terminal voltage of said generator for inversely varying the energization of said control field winding to maintain constant said generator terminal voltage, a second control field winding for said dynamo-electric machine, means responsive to the electrical load on said generator for energizing said second control field only in one direction to limit field excitation reducing action of said first control field to a predetermined value, means responsive to the internal generated voltage of said generator for preventing energization of said second control field, and a unidirectional current conducting device associated with said second control field winding and effective to prevent energization of said second control field winding in a reverse direction.

8. A regulating system for an electric generator having a field winding comprising, controllable excitation supply means for said field winding, means responsive to generator output voltage for continuously regulating said field excitation means to maintain constant said output voltage, and means energized in accordance with the internal generated voltage back of transient reactance of said generator for modifying the action of said continuous regulating means to prevent said continuous regulating means from reducing the field excitation to said field winding below a predetermined minimum value.

9. A regulating system for an electric generator having a field winding comprising, controllable excitation supply means for said field winding, means responsive to generator output voltage for continuously regulating said field excitation means to maintain constant said output voltage, and means responsive to the internal generated voltage back of transient reactance of said generator for modifying the action of said voltage responsive means to prevent said voltage responsive means from reducing the field excitation to said field winding below a predetermined minimum value, said last mentioned means including an electrical impedance element having an ohmic value effectively equal to the ohmic value of transient reactance of said generator.

10. A regulating system for a synchronous generator having a field winding comprising, field excitation supply means including a dynamo-electric exciter, means responsive to generator output voltage for continuously regulating said exciter output to maintain constant said generator output voltage, and means responsive to the internal generated voltage back of transient reactance of said generator for increasing the excitation to said field winding, thereby to prevent said continuous regulating means from reducing field excitation below a predetermined minimum.

11. A regulating system for a synchronous generator having a field winding comprising, field excitation supply means including a dynamo-electric exciter, means responsive to generator output voltage for continuously regulating said exciter output to maintain constant said generator output voltage, and means responsive to the internal generated voltage back of transient reactance of said generator for increasing the excitation to said field winding, thereby to prevent said continuous regulating means from reducing field excitation below a predetermined minimum, said last mentioned means including an electrical impedance element having an ohmic value effectively equal to the ohmic value of transient reactance of said synchronous generator.

SELDEN B. CRARY.

REFERENCES CITED

The following references are of record in the file of this patent:

UNITED STATES PATENTS

| Number | Name | Date |
| --- | --- | --- |
| 1,617,007 | Baum | Feb. 8, 1927 |
| 1,909,137 | Thompson | May 16, 1933 |
| 1,934,529 | Forbes | Nov. 7, 1933 |
| 1,935,290 | Evans | Nov. 14, 1933 |
| 1,948,750 | Evans et al. | Feb. 27, 1934 |
| 2,005,894 | Hellmund et al. | June 25, 1935 |
| 2,011,655 | Schaelchin et al. | Aug. 20, 1935 |
| 2,259,091 | Thompson et al. | Oct. 14, 1941 |
| 2,358,456 | Haug | Sept. 19, 1944 |
| 2,383,306 | Hanna et al. | Aug. 21, 1945 |